(12) United States Patent
Ruehle (10) Patent No.: US 6,732,133 B2
(45) Date of Patent: May 4, 2004

(54) MONTGOMERY MULTIPLIER WITH DUAL INDEPENDENT CHANNELS

(75) Inventor: Michael D. Ruehle, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 222 days.

(21) Appl. No.: 09/965,915

(22) Filed: Sep. 28, 2001

(65) Prior Publication Data

US 2003/0065694 A1 Apr. 3, 2003

(51) Int. Cl.⁷ .................................................. G06F 7/38
(52) U.S. Cl. ....................................................... 708/491
(58) Field of Search ................................. 708/491–492; 380/28

(56) References Cited

U.S. PATENT DOCUMENTS 6,061,706 A    5/2000  Gai et al.
6,151,393 A *  11/2000 Jeong ........................... 708/491

OTHER PUBLICATIONS

Colin D. Walter, Systolic Modular Multiplication, 0018–9340/93, IEEE 1993, pp. 376–378.

* cited by examiner

Primary Examiner—Tan V. Mai
(74) Attorney, Agent, or Firm—John F. Travis (57) ABSTRACT

A linear systolic array Montgomery multiplier circuit that concurrently processes two separate Montgomery multiplications on alternate clock cycles, without a requirement to have any common parameters between the two multiplications. Multiples of two different parameters are stored in storage elements for each multiplication. Two sets of these multiples, one set for each of the two multiplications, are stored in separate storage banks and accessed on alternate clock cycles by each processing element in the array. Two sequences of control codes for the two multiplications are interleaved as they are fed into a first processing element.

19 Claims, 4 Drawing Sheets

FIG. 5 ized unit. These terms refer to...

MONTGOMERY MULTIPLIER WITH DUAL INDEPENDENT CHANNELS

BACKGROUND OF THE INVENTION

1. Field of the Invention

The invention pertains generally to computers. In particular, it pertains to a linear systolic array Montgomery multiplier.

2. Description of the Related Art

Exponentiation of large numbers has many uses, including public key encryption such as the Rivest-Shamir-Adleman (RSA) algorithm for data encryption and decryption. A common approach to performing the exponentiation, known as the 'square and multiply' technique, performs a square operation (multiplying the accumulated result by itself) for each bit in the exponent, and a 'multiply' operation (multiplying the accumulated result by a base number) for every '1' bit in the exponent. Assuming an equal number of '1's and '0's in the average exponent, a typical exponentiation using 1024-bit numbers requires over 1500 operations, with each operation involving 1024-bit numbers.

Montgomery multipliers are frequently used to perform the RSA and similar algorithms more efficiently by using a transform. Montgomery multipliers perform a transform of the operation needed for exponentiation by performing the operation A×B mod M (the remainder of A times B divided by M), and for large numbers is much more efficient than a direct approach to performing the math. Some Montgomery multipliers use a linear systolic array, i.e., a chain of identical processing elements (PEs), with each PE working on a portion (typically four bits) of each of the large numbers involved. The chain contains enough PEs to hold the largest of the numbers involved, including interim results. Carries and other interim values of the operation are fed in both directions between adjacent PEs.

Because of the clocked chain design of a linear systolic array Montgomery multiplier (LSAMM), each PE processes data for one clock cycle, then waits for one clock cycle to receive interim values from the adjacent PEs. Adjacent PEs are one clock cycle out of sync, i.e., the odd-numbered PEs are processing while the even-numbered PEs are waiting, and vice-versa. This means that each PE is idle half the time, and those idle cycles represent wasted resources. The idle cycles, which can be considered a separate channel, can be used to perform another operation. However, in a conventional LSAMM circuit, two of the three parameters (e.g., B and M) must be the same in both channels. With this limitation, the conventional approach to utilizing some of these wasted cycles in a square-and-multiply operation is to perform the squares for an exponentiation in one channel, and to perform the multiplies for the same exponentiation in the alternate channel. Since the average exponent contains a '1' in approximately half the bit positions, only half the cycles in the alternate channel are used for multiplies, while the remaining cycles in that channel, about 25% of the total cycles in both channels, remain idle and wasted.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Various portions of the description refer to parts of the invention with the terms 'right', 'left', 'right-hand', 'left-hand', 'right-most', or 'left-most'. These terms refer to relative orientation as shown in the figures, and should not be interpreted as limitations on the physical implementation of the invention.

Various embodiments use a linear systolic array Montgomery multiplier (LSAMM) that can perform separate operations on two channels, without a requirement that two of the parameters be the same on both channels. In one embodiment, one channel is used to perform both squares and multiplies for a first operation, while the other channel is used to perform both squares and multiplies for a second operation. Although each operation can take 50% longer than it would using one channel for squaring and the alternate channel for multiplying in the same operation, two operations may be performed at once so that total throughput is greater than in a conventional LSAMM.

The invention may be implemented in hardware, software, or firmware. The invention may also be implemented as instructions stored on a machine-readable medium, which can be read and executed by at least one processor to perform the operations described herein. In one embodiment a set of one or more processors executes instructions to cause a Montgomery multiplier to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Figure 1:
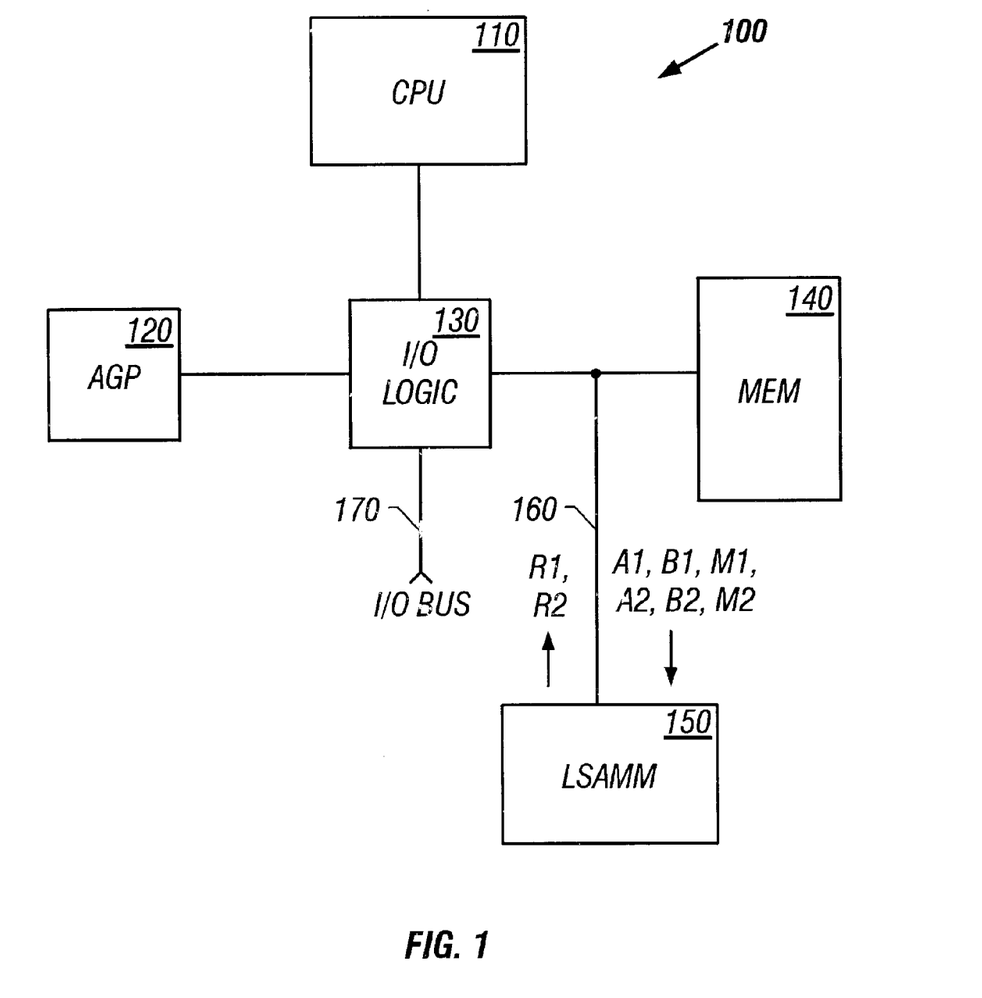
FIG. 1 shows a system according to one embodiment of the invention

FIG. 1 shows a system according to one embodiment of the invention. In the illustrated embodiment of FIG. 1, system 100 includes input/output (I/O) logic 130 coupled to a processor (CPU) 110, an accelerated graphics processor (AGP) 120, a memory 140, an LSAMM 150, and an I/O bus 170 coupled to various I/O devices not shown. In the embodiment of FIG. 1, the LSAMM 150 is connected to memory bus 160, where the LSAMM 150 can be addressed by the CPU 110 and/or other devices as a block of memory, but various other embodiments have the LSAMM 150 connected to the system in other ways. In the embodiment of FIG. 1, any device that can write two sets of parameters (e.g., A1, B1, M1, and A2, B2, M2) to the LSAMM 150 and read two final results (R1, R2) from the LSAMM 150 can initiate two concurrent Montgomery multiplications in the LSAMM 150. Although the terms 'A', 'B', and 'M', are used throughout this disclosure to represent the parameters in a Montgomery multiplication, these are generic designations. Any other terms may be used without departing from the invention.

Figure 2:
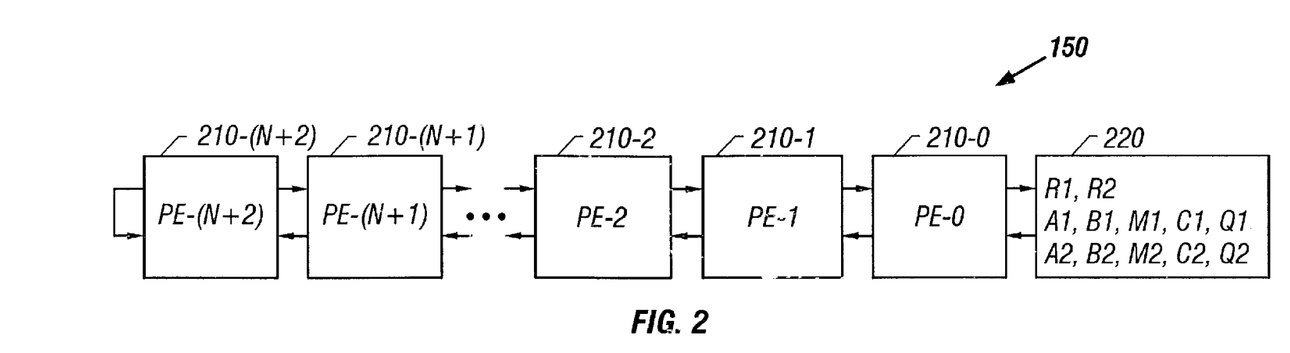
FIG. 2 shows a linear systolic array Montgomery multiplier according to one embodiment of the invention.

FIG. 2 shows a linear systolic array Montgomery multiplier according to one embodiment of the invention. In the illustrated embodiment of FIG. 2, a chain of serially-connected PEs is used to perform two concurrent Montgomery multiplications, one Montgomery multiplication with a first set of parameters A1, B1, M1, and the other Montgomery multiplication with a second set of parameters A2, B2, M2, with each parameter being distributed through the PEs at one digit per PE. In the context of the invention, a digit is defined as the number of bits of each parameter processed by each PE. In example embodiments used throughout this disclosure, a digit is a four-bit hexadecimal number, and each PE operates on four bits of A and/or four bits of B and/or four bits of M at a time in a given operation. In other embodiments, digits of other sizes are used, and the distribution of bits in the PEs differs from the examples accordingly.

The illustrated embodiment of FIG. 2 shows a chain with a quantity of (N+3) PEs, numbered 210-0 through 210-(N+2), and labeled as PE-0 through PE(N+2). In one embodiment, the LSAMM 150 operates on 1024-bit parameters, the value of N is 256, and the number of PEs is 259, including 256 PEs to hold 256 hexadecimal digits of the parameters, and 3 additional PEs to accommodate interim results during processing. Montgomery multiplier (MM) controller 220 controls the process by transferring parameters A1, B1, M1, and A2, B2, M2 into the chain. In one embodiment, each parameter is passed from MM controller 220 to PE-0 one digit at a time and propagates through the chain of PEs from right to left. MM controller 220 also passes sets of control codes C1, C2 and sets of other values Q1, Q2, which are described later, into PE-0 for propagation through the chain of PEs.

In one embodiment, the chain of PEs is set up for a Montgomery multiplication by sequentially passing each parameter B1, B2, M1, and M2, one digit at a time, from MM controller 220 into the chain of PEs until each parameter is distributed throughout PE-0 through PE-N. In one embodiment, multiples of each parameter B1, B2, M1, M2 are calculated within the PEs and stored within the PEs. To perform the actual Montgomery multiplications, parameter A1 is then sequentially passed one digit at a time to the left from MM controller 220 to PE-0, PE-1, PE-2, etc., in alternating clock cycles, to operate on the stored multiples of B1 and M1. In the intervening clock cycles, parameter A2 is sequentially passed one digit at a time to the left from MM controller 220 to PE-0, PE-1, PE-2, etc., to operate on stored multiples of B2 and M2. When all digits of A1 and A2 have passed through the chain of PEs, the multiplication operations are complete, with the results R1 and R2 residing in the PEs. If the Montgomery multiplications are finished, the results R1 and R2 are then passed to the right through the PEs and into MM controller 220. In one embodiment, if M1, M2 remain unchanged and if the results R1, R2 provide the values of B1, B2 for the next Montgomery multiplications (as is often the case in RSA operations), multiples of R1, R2 are calculated and stored in the PEs as multiples of B1, B2 without being shifted into the MM controller 220. New values of A1, A2 are then shifted through the PEs as before to perform the next pair of Montgomery multiplications.

In one embodiment, if only one Montgomery multiplication is to be performed, the second channel is provided with 'no-operation' control codes so that no multiplication will take place in that channel, and the other parameters for the non-operating channel do not have to be loaded. In another embodiment, dummy values can be used for parameters on the unused channel, and the results on that channel ignored.

In the illustrated embodiment, parameters A1, A2, B1, B2, M1, M2, and results R1, R2 each represent a large number that is distributed through the chain of PEs, one digit per PE. Control codes are each small enough to fit into a single PE, and each control code directs the PE in which it is currently located to perform an operation on the values currently contained in that PE during a given clock cycle. C1 in FIG. 2 represents multiple control codes for channel 1, the individual control codes generically designated herein as c1, with each c1 being fed into PE-0 and propagated up the chain of PEs along with the digits of the associated parameters A1 and/or B1 and/or M1, to control the operation of the PE in which c1 resides in any given clock cycle. Similarly, C2 represents multiple control codes c2 for channel 2. Q1 and Q2 in FIG. 2 also represent multiple parameters q1 and q2, each small enough to fit into each PE, and are passed through the PEs to the left along with the digits of the associated parameters to further define the operation in each PE. For each type of operation, C1 is a predetermined sequence of values c1, and C2 is a predetermined sequence of values c2. For some types of operations Q1 is a predetermined sequence of values q1, and Q2 is a predetermined sequence of values q2. For other types of operations, the various values of q1 and q2 are determined in PE-0 and propagated through the chain from PE-0.

During operation of the LSAMM 150, each PE passes information to adjacent PEs in both directions. In one embodiment, each PE performs an internal operation on channel 1 during one clock cycle as specified by that PE's current values of c1, q1 and the digit of A1, then performs another internal operation on channel 2 during the next clock cycle as specified by the PE's current values of c2, q2, and the digit of A2. In one embodiment, the even-numbered PEs perform operations in a first Montgomery multiplication in the odd-numbered clock cycles and perform operations in a second Montgomery multiplication in the even-numbered clock cycles, while the odd-numbered PEs perform operations in the first Montgomery multiplication in the even-numbered clock cycles and perform operations in the second Montgomery multiplication in the odd-numbered clock cycles. In one embodiment, these alternating cycles are created by the MM controller 220 by providing PE-0 the digits of A1, c1, and q1 on even-numbered clock cycles, and providing PE-0 the digits of A2, c2, and q2 on odd-numbered clock cycles.

Alternate Cycle Processing

Figure 3:
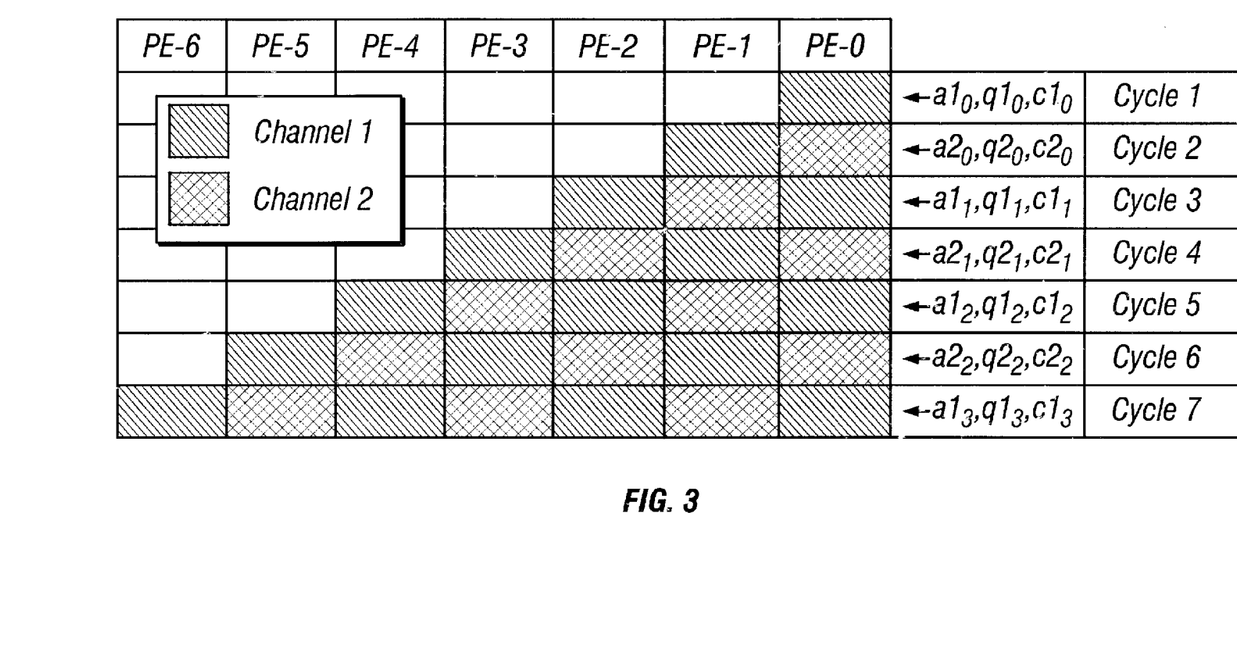
FIG. 3 shows a chart of two Montgomery multiplications propagating through a linear systolic array Montgomery multiplier according to one embodiment of the invention.

FIG. 3 shows a chart of two Montgomery multiplications propagating through a linear systolic array Montgomery multiplier according to one embodiment of the invention. A single Montgomery multiplication can require hundreds of PEs and thousands of clock cycles to complete. To avoid making FIG. 3 overly complex, the chart shows only the first few PEs and clock cycles. In the illustrated embodiment of FIG. 3, the dark areas represent the clock cycles in which the indicated PEs perform work on a first operation, and are labeled as channel 1. The crosshatched areas represent the clock cycles in which the indicated PEs perform work on a second operation, and are labeled as channel 2. As can be seen, for any specific PE, the clock cycles of channel 1 are interleaved with the clock cycles of channel 2. FIG. 3 shows parameters in the format $xY_z$, in which x represents a digit of A, Q, or C as shown, Y represents channel 1 or channel 2, and z represents which digit (0-N) of the indicated parameter is being supplied.

The operations shown by FIG. 3 are described as follows:

1) At the beginning of clock cycle 1, the first digit of A1 ($a1_0$), the associated parameter $q1_0$, and the associated control code $c1_0$ are provided by MM controller 220 to PE-0. During clock cycle 1, PE-0 performs an internal operation defined by control code $c1_0$, and which may further be defined by $a1_0$ and $q1_0$.

2) At the beginning of clock cycle 2, $a1_0$, $q1_0$, and $c1_0$ are passed to PE-1 by PE-0, and PE-1 performs the same operation that was performed by PE-0 in clock cycle 1, although the internal data on which it operates may be different. Also at the beginning of clock cycle 2, the first digit of A2 ($a2_0$), the associated parameter $q2_0$, and the associated control code $c2_0$ are provided by MM controller 220 to PE-0. During clock cycle 2, PE-0 performs an internal operation defined by control code $c2_0$, and which may further be defined by $a2_0$ and $q2_0$.

3) At the beginning of clock cycle 3: 1) $a1_0$, $q1_0$, and $c1_0$ are passed to PE-2 by PE-1 to perform the operation defined by those values in PE-2, 2) $a2_0$, $q2_0$, and $c2_0$ are passed to PE-1 by PE-0 to perform the operation defined by those values in PE-1, and 3) $a1_1$, $q1_1$, and $c1_1$ are provided by MM controller 220 to PE-0 to perform a new operation defined by those values in PE-0.

4) In subsequent clock cycles, this process continues, with the specific values of a, q, and c being propagated through the chain of PEs to perform the operation defined by those specific values in each PE. Although the specific values of a, q, and c are passed from PE to PE unchanged, each PE has internal data to be operated upon by those specific values, and the internal data may be different in each PE.

Processing Element

Figure 4:
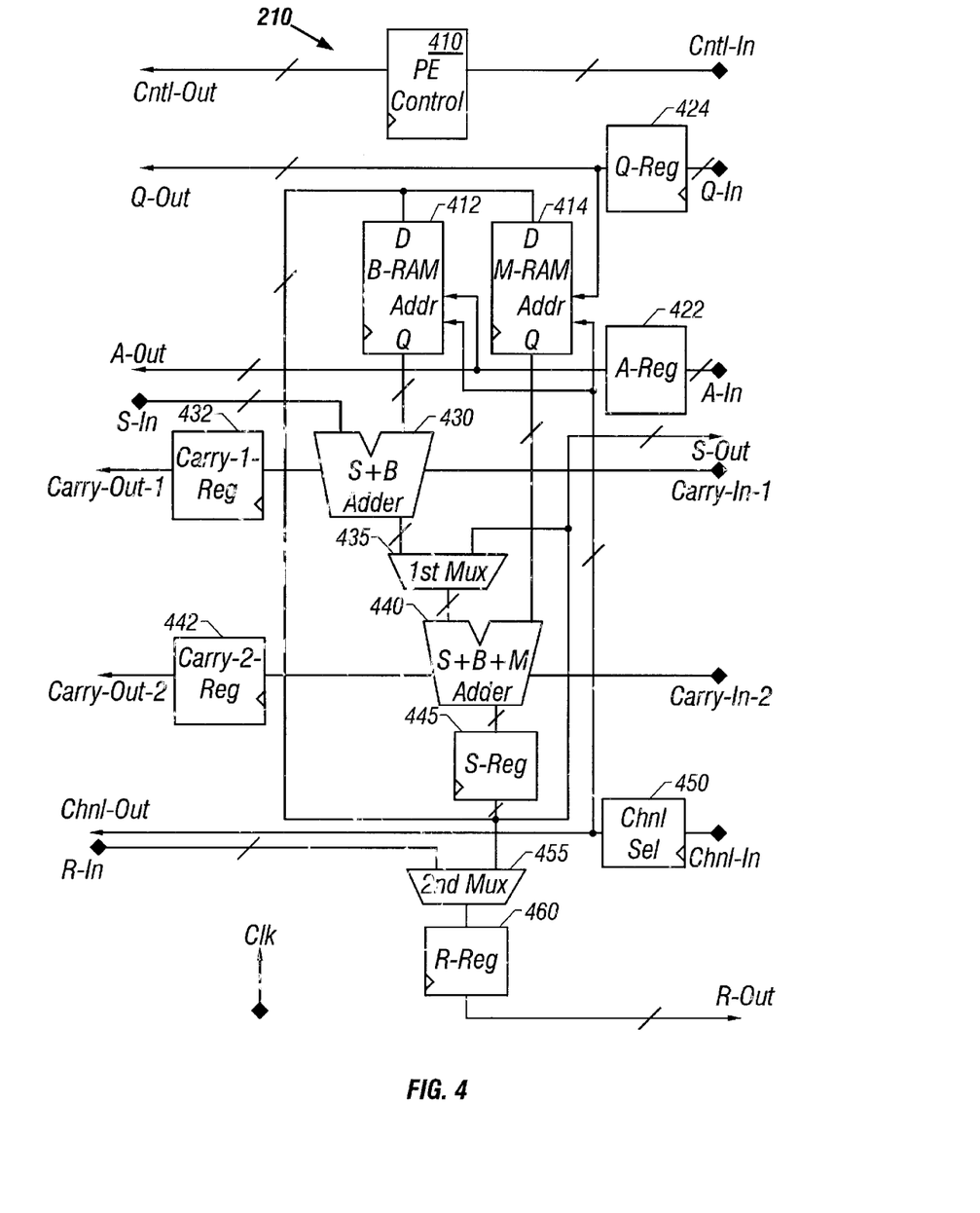
FIG. 4 shows a schematic of a processing element according to one embodiment of the invention.

FIG. 4 shows a schematic of a processing element according to one embodiment of the invention. In the illustrated embodiment of FIG. 4, PE 210 includes two storage elements (B-RAM 412 and M-RAM 414), and processing logic that includes PE control logic 410, two address registers (Q-register 424 and A-register 422), two adders (S+B Adder 430 and S+B+M Adder 440), two multiplexers (first multiplexer 435 and second multiplexer 455), two carry registers (Carry-1-register 432 and Carry-2-register 442), an accumulation register (S-register 445), a Channel selection register 450, and a results register (R-register 460). Although a single PE 210 is described, in one embodiment PE 210 is generic to every PE 210-x in the chain. In the illustrated embodiment, connections shown at the bottom of FIG. 4 are common to multiple PEs, connections shown to the right interface with the PE to the right, and connections shown to the left interface with the PE to the left, with outputs from one PE connected to similarly-named inputs of the adjacent PE. Exceptions are PE-0, which interfaces to MM controller 220 on the right, and PE-(N+2), which has no PE to its left.

In one embodiment Clk, Carry-In-1, Carry-Out-1, Carry-In-2, Carry-Out-2, Chnl-In, Chnl-Out, and all internal connections to propagate those signals contain one bit each, while Cntl-in and Cntl-Out contain the number of bits necessary to identify each of the various control codes. All the remaining connections shown in FIG. 4 contain the number of bits being processed by each PE, such as four bits each for the illustrated embodiment. In one embodiment, each PE also includes other inputs and outputs as necessary, e.g., a Reset input (not shown).

In one embodiment, the various logic elements of FIG. 4 perform the following operations: Control logic 410 latches a control code received from the PE to the right, uses that control code to control the logic elements of the present PE during a current clock cycle, and then passes the control code to the PE to the left. Storage element B-RAM 412 is used to store one digit of each multiple of B that is stored in the PE chain, while storage element M-RAM 414 is used to store one digit of each multiple of M that is stored in the PE chain. A-register 422 and Q-register 424 hold the addresses that select the desired locations within B-RAM 412 and M-RAM 414, respectively, (both for reading and for writing) and also pass these addresses to the PE to the left. S+B Adder 430 is used to add the contents of a selected location in B-RAM 412 to the contents of the S-register in the PE to the left, including any carry bit received through the Carry-In-1 input from the S+B Adder in the PE to the right. Carry-1-Register 432 latches any carry bit from S+B Adder 430 and provides it as a carry bit to the S+B Adder in the PE to the left during the next clock cycle. When the left-hand input of first multiplexer 435 is selected, S+B+M Adder 440 adds the output of S+B Adder 430 to the contents of a selected location in M-RAM 414. When the right-hand input of first multiplexer 435 is selected, S+B+M Adder 440 adds the contents of S-Register 445 to the contents of the selected location in M-RAM 414. Any received carry bit is provided from the PE to the right through the Carry-In-2 input, and any generated carry bit is latched into Carry-2-Register 442 for use by the PE to the left in the next clock cycle. The output of S+B+M Adder 440 is latched into S-register 445, which acts as an accumulation register for interim results. The output of S-register 445 is distributed to each of B-RAM 412, M-RAM 414, first multiplexer 435, and the S-Out output for use by the PE to the right. R-register 460 latches the output of S-register 445 if the right-hand input of second multiplexer 455 is selected, and otherwise latches the contents of the R-register in the PE to the left. Channel selection register 450 is coupled to an address bit of both B-RAM 412 and M-RAM 414 to select either a first bank of addresses or a second bank of addresses in both storage elements. Within each bank, A-register 422 and Q-register 424 select specific locations as described above. In one embodiment, the channel selection values are propagated from right to left through the Channel selection registers of the PEs along with the values in the A- and Q-registers. In one embodiment, the channel selection values are part of the control codes.

In the embodiment of FIG. 4, Clk is used to latch data into the Control logic, into the Q-, A-, S-, R-, Carry-1- and Carry-2-, and Channel selection registers, and to clock write operations in the B- and M-RAMs, while both adders, both multiplexers, and the read operations in the B- and M-RAMs are combinatorial, i.e., any change at an input is propagated through to the logic element's output regardless of clock status. In another embodiment, the B- and M-RAMs use a clocked input for read as well as write operations. In one embodiment, clock speed is chosen so that worstcase combinatorial delays in PE 210 are less than one clock cycle. Specific connections from the Clk input to other circuit elements is not shown in FIG. 4 to avoid making the figure overly complex.

Control logic 410 contains the logic necessary to control the operation of PE 210, based on control codes received through Cntl-In. In one embodiment, control logic 410 includes a decoder circuit to convert the control code to necessary control signals. In another embodiment, the control code is simply latched, with each bit of the control code specifying a particular control signal. In one embodiment, the control codes specify operations that include but are not limited to: selecting one of the two inputs of first multiplexer 435, selecting one of the two inputs of second multiplexer 455, writing to B-RAM 412, writing to M-RAM 424, resetting one or more of the A, Q, S and R registers, and inhibiting the clock signal to various logic elements.

Because a Montgomery multiplication operates with multiples of B and M, one embodiment pre-calculates the multiples within the PEs, using the same logic that is used for the Montgomery multiplication. In the illustrated embodiment of FIG. 4, the storage elements include random access memories (RAM), labeled B-RAM and M-RAM to indicate the parameters being stored. Even though the terms 'B-RAM' and 'MRAM' are used throughout the disclosure, in some embodiments, types of storage elements other that RAM are used. Collectively, all the B-RAMs 412 in the PE chain provide a first bank of storage space for values of (0×B1), (1×B1), (2×B1), etc., and a second bank of storage space for values of (0×B2), (1×B2), (2×B2), etc. In one embodiment in which each PE operates on a hexadecimal digit, B-RAM 412 includes 32 4-bit storage locations, 16 locations to hold the digits of (0×B1) through (15×B1) and another 16 locations to hold corresponding digits of (0×B2) through (15×B2). Similarly in the same embodiment, M-RAM 414 includes 32 4-bit storage locations to hold corresponding digits of (0×M1) through (15×M1) and (0×M2) through (15×M2). In an embodiment in which each PE processes a number of bits other than four, the number of locations in each RAM are changed accordingly to address and store the required number of multiples for each set of parameters.

In some embodiments, a single value of a given parameter is always used for both Montgomery multiplications. In these embodiments, the corresponding storage element provides storage for multiples of only the single value of the parameter, and the connection from Channel selection register 450 to that storage element is eliminated so that both Montgomery multiplications read from the same bank of multiples. In one such embodiment, M-RAM 414 contains sixteen locations to store a digit of the multiples (0×M) through (15×M), and Channel selection register 450 does not control an address input line to M-RAM 414. An embodiment that is designed to hold two independent values of M can also be used for applications that have a single value of M by making M1 and M2 have the same value.

In one embodiment, Channel selection register 450 is a latch containing a one-bit selection value that is propagated through the PEs along with control codes and values in the A- and Q-registers. When the one-bit selection value is in one state it selects the first bank in B-RAM 412 and in M-RAM 414, and when the one-bit selection value is in another state it selects the second bank in B-RAM 412 and M-RAM 414. Thus Channel selection register 450 can select the bank of values for the channel that is operable in a given PE during a given clock cycle.

Figure 5:
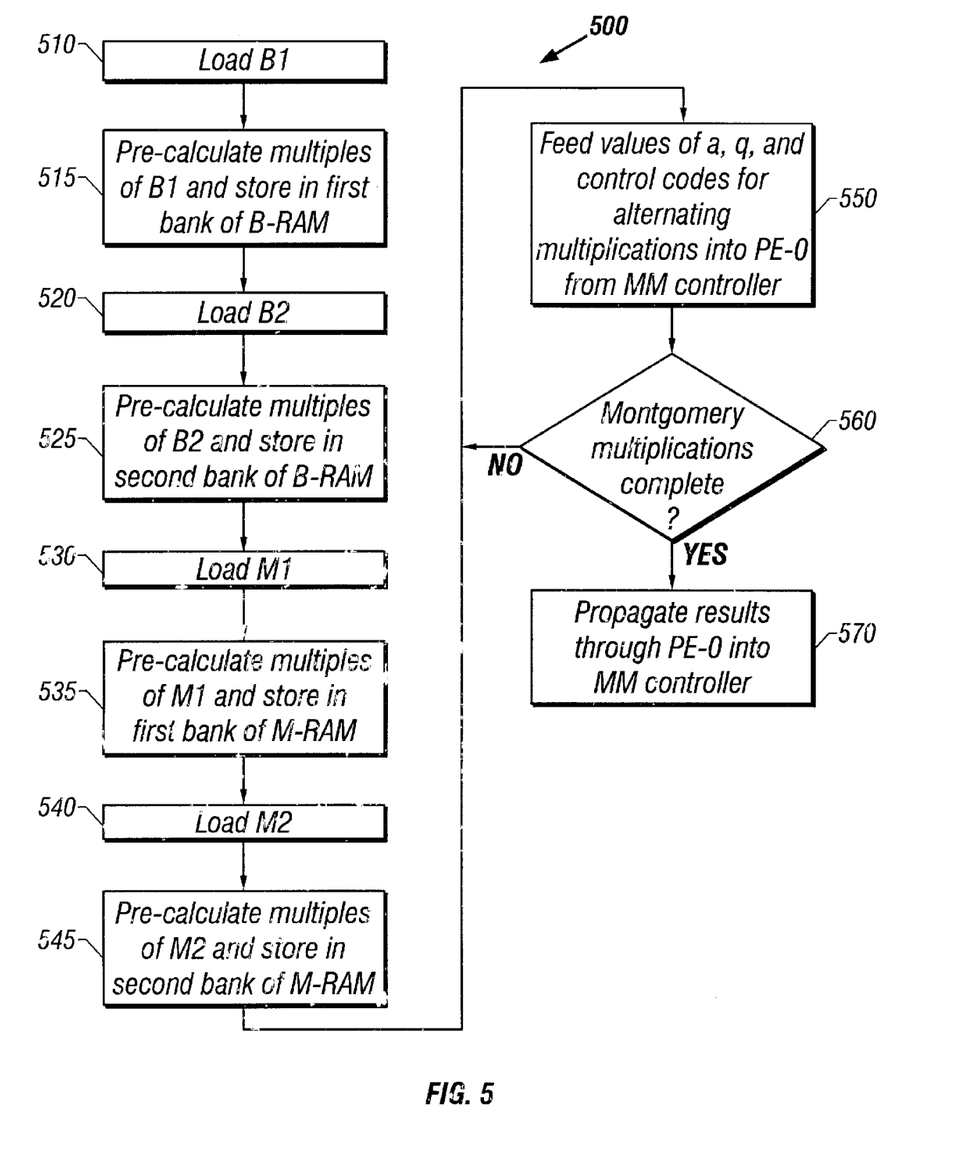
FIG. 5 shows a flow chart of a method according to one embodiment of the invention.

FIG. 5 shows a flow chart of a method according to one embodiment of the invention. The illustrated embodiment of FIG. 5 sets up two Montgomery multiplications in blocks 510–545, performs the two Montgomery multiplications concurrently in block 550, 560, and propagates the results out of the PEs in block 570.

The logic of PE 210 can be used in various ways, depending on the operation being performed at the time. In one embodiment, the PEs can perform each of the following, which are described in more detail in the following sections:

1) Load initial values into the B-RAMs and/or M-RAMs.
2) Pre-calculate multiples of B1 and B2 and store in the B-RAMs.
3) Pre-calculate multiples of M1 and M2 and store in the M-RAMs.
4) Perform concurrent Montgomery multiplications.

The following descriptions pertain to both FIG. 4 and FIG. 5.

Load Initial Values into the B-RAMs and/or M-RAMs

In an LSAMM, each Montgomery multiplication starts with initial values for B and M in the PEs. Under some conditions, the result of one Montgomery multiplication is an initial value for the next Montgomery multiplication, so that the new initial value does not have to be loaded. In one embodiment, at the end of a multiplication S-register 445 contains a digit of the final result, which is then loaded as an initial value for the next Montgomery multiplication into B-RAM 412 (or M-RAM 414) at an address specified by A-register 422 (or Q-register 424) and Channel selection register 450.

Under other conditions, B-RAM 412 and/or M-RAM 414 require one or more initial values that are not contained in the PE, so the initial values are loaded as shown in blocks 510, 520, 530, and 540 of FIG. 5. In one embodiment, an initial value is propagated through the PEs through the S-registers until each digit is in its proper PE, whereupon the digit is written into the corresponding RAM. With reference to FIG. 4, by zeroing the outputs of B-RAM 412 and M-RAM 414, and selecting the left-hand input of first multiplexer 435, adders 430 and 440 will pass through the value from S-In unchanged and load it into S-register 445. Thus initial values can be propagated into and through the chain of PEs through the S-registers. However, because the S-registers are designed to pass data from left to right, in one embodiment the values begin propagating through the S-registers starting with PE-(N+2). In one embodiment, MM controller 220 has a separate output to S-In of PE-(N+2) and feeds the digits of the initial value directly into PE-(N+2). In another embodiment, MM controller 220 feeds the digits of the initial value into an address register (A- or Q-) of PE-0 and propagates the digits through the chain of PEs from right to left. A loopback circuit then loops the address register output of PE-(N+2) back to the S-In input of PE-(N+2), from where the digits are propagated from left to right through the S-registers as before. When a digit of the initial value is within the S-register of its correct PE, the contents of the S-register are loaded into a specified location of the B- or M-RAM.

Regardless of whether the initial values are propagated solely through the S-registers or are propagated through the address registers first, in one embodiment only one initial value is propagated through the PEs at a time, without interleaving, until every digit of the initial value is in its proper PE. Multiples of that digit are then calculated and stored as described in one of the next two sections before the next initial value is propagated into the S-registers. For example, in the illustrated embodiment of FIG. 5, B1 is loaded by propagating the digits of B1 through the S-registers in block 510, and multiples of B1 are calculated and stored at block 515. Then B2 is loaded by propagating the digits of B2 through the S-registers in block 520, and multiples of B2 are calculated and stored in block 525. In a similar manner, if initial values of M1 and M2 are required, M1 and M2 are separately propagated into place and their multiples separately calculated and stored in blocks 530, 535, 540, and 545. Although these parameters are shown being handled in the order B1, B2, M1, M2, in one embodiment the parameters may be handled in any order.

In another embodiment, the digits of B1 and B2 are interleaved while being concurrently propagated into the PEs and stored in the storage elements, and the digits of M1 an M2 are likewise interleaved while being concurrently propagated into the PEs and stored in the storage elements. The multiples of each parameter are then calculated separately as described in the previous paragraph.

Pre-Calculate Multiples of B1 and B2 and Store in the B-RAMs

In the illustrated embodiment, a digit of each multiple of B1 is calculated and stored in the B-RAM 412 as shown in block 515 by executing the following in each PE:

1) Clear the contents of the first location of the lower bank in B-RAM 412. In one embodiment, this operation is performed by zeroing the contents of S-register 445, zeroing the contents of A-register 422, setting Channel selection register 450 to zero, and setting B-RAM 412 to 'write' so that the zeroes of S-register 445 are written into the first location of the lower bank in B-RAM 412.

2) Load the correct digit of B1 into S-register 445 through the process previously described in the section 'Load Initial Values into the B-RAMs and/or M-RAMs'.

3) To calculate all multiples of B1, clear Q register 424, set M-RAM 414 to 'write', and write the digit of B1 from S-register 345 into location 0 of the lower bank of M-RAM 414. M-RAM 414 is a temporary holding place for this value, and can be cleared at the end of the pre-calculation steps.

4) Set M-RAM 414 to 'Read' and leave Q-register 424 and Channel selection register 450 cleared to continuously read the digit of B from M-RAM 414. Set B-RAM 412 to 'write', clear S-register 445 and set A-register 422 to '0'.

Select the right-hand input of multiplexer 435 so that S+B+M Adder 440 will add the digit of B1 from M-RAM 414 to the current value in S-register 445, and latch that sum as the new value in S-register 445, including the effect of any relevant carry bit received at Carry-In-2. (Any carry bit produced by this addition is latched into Carry-2-Reg 442 for use by the PE to the left.)

6) Increment the value in A-register 422 with each new value in S-register 445 so that the changing value in S-register 445 is stored into successive locations 0, 1, 2, 3, etc. in B-RAM 412. After incrementing through all multiples of B1, the result in B-RAM 412 is that location 0 contains a digit of 0×B1, location 1 contains the same digit of 1×B1, location 2 contains the same digit of 2×B1, location 3 contains the same digit of 3×B1, etc. When this process has been applied to PEs 0 through N, the pre-calculation and storage of multiples of B1 is complete.

To calculate multiples of B2 and store them in B-RAM 412 as shown in block 525, repeat 1) through 6), but select the upper bank of B-RAM 412 by setting Channel selection register 450 to '1', and load the proper digit of B2 into S-register 445.

Pre-Calculate Multiples of M1 and M2 and Store in the M-RAMs

In the illustrated embodiment, a digit of each multiple of M1 is calculated and stored in the M-RAM 414 as shown in block 535 by executing the following in each PE:

1) Clear the contents of the first location of the lower bank in M-RAM 414. In one embodiment, this operation is performed by zeroing the contents of S-register 445, zeroing the contents of Q-register 424, setting the Channel selection register 450 to zero, and setting M-RAM 414 to 'write' so that the zeroes of S-register 445 are written into the first location of the lower bank in M-RAM 414. In one embodiment, all locations in M-RAM 414 are cleared to zero, so that if M-RAM 414 is implemented with a design that always reads the selected location (even when in write mode), the outputs will not interfere with the additions performed in paragraph 5) below.

2) Load the correct digit of M1 into S-register 445 through the process described above under the section 'Load Initial Values into the B-RAMs and/or M-RAMs'.

3) Clear Q register 424, and write the digit of M1 from S-register 445 into location 0 of M-RAM 414. Location 0 is a temporary holding place for this value, and can be cleared at the end of the pre-calculation steps.

4) Select the right-hand input of multiplexer 435 so that S+B+M Adder 440 will add a value read from M-RAM 414 to the current value in S-register 445, and store that sum as the new value in S-register 445, including the effect of any relevant carry bit received at Carry-In-2. (Any carry bit produced by this addition is latched into Carry-2-Reg 442 for use by the PE to the left.). In this manner, the value in S-register 445 will successively change through the same digit of 1×M1, 2×M1, 3×M1, etc. with each addition.

5) Alternate the contents of Q-register 424 between an incrementing counter and zero: 1, 0, 2, 0, 3, 0, etc. When the Q-register 424 holds a zero, place M-RAM 414 in a read state to read the value of M1 out of location 0. When the Q-register 424 holds one of the incrementing counter values, place M-RAM 414 in a write state to write the accumulated value from S-register 445 into that location. In this manner, the digit of M1 is read from location 0 in M-RAM 414 and added to the accumulated multiple of M1 in S-register 445, including the effect of any received carry bit. The sum is then written to a location in M-RAM 414 that increments with each write operation. The result in M-RAM 414 is that location 1 contains a digit of 1×M1, location 2 contains the same digit of 2×M1, location 3 contains the same digit of 3×M1, etc.

6) Zero S-register 445 and Q-register 424 and write the zero contents of S-register 445 into location 0 of M-RAM 414. When the process has been applied to PEs 0 through N, pre-calculation and storage of multiples of M1 is complete.

To calculate multiples of M2 and store them in M-RAM 414 as shown in block 545, repeat 1) through 6), but select the upper bank of M-RAM 414 by setting Channel selection register 450 to '1', and load the proper digit of M2 into S-register 445.

In one embodiment for implementing the foregoing operations, the contents of A-register 422 and Q-register 424 are set to zero through a control code. In another embodiment, the contents of A-register 422 and Q-register 424 are set to zero by propagating the zero value through the PE chain as are other values in the A- and Q-registers.

Perform Concurrent Montgomery Multiplications

Block 550 of FIG. 5 covers performing two Montgomery multiplications in alternating clock cycles. In one embodiment, the operation within each PE is triggered and controlled by feeding the correct values of a, q and the control codes into PE-0 in the correct sequence, and the rest of the operation is automatic, based on the circuitry of the PEs. In the illustrated embodiment of FIG. 4, each PE performs in the following manner in a particular Montgomery multiplication involving A1, B1, and Q1: Channel selection register 450 is cleared to address the lower banks of B-RAM 412 and M-RAM 414, which contain multiples of B1 and M1. A-register 422 latches a digit of A1 to select a digit of a multiple of B1 in B-RAM 412, Q-register 424 latches a q value to select a digit of a multiple of M1 in M-RAM 424, and Control logic 410 latches a control code to control the logic elements of PE 210 during the current clock cycle. All three values are received from the PE to the right (or from MM controller 220 in the case of PE-0) and are passed on to the PE to the left on the following clock cycle. Using S+B Adder 430, the selected location of B-RAM 412 is added to the current contents of the S-register in the PE to the left. Carry bits are propagated from right to left using the Carry-In-1 input and the Carry-Out-1 output so that S+B Adder 430 of the current PE acts in concert with the S+B Adders of the other PEs to add the value of a selected multiple of B1 to a right-shifted (by one digit) value of an interim result in the S registers. In a similar manner, S+B+M Adder 440 uses propagating carry bits at Carry-In-2 and Carry-Out-2 to perform a larger addition in concert with the S+B+M Adders of the other PEs. The left-hand input of first multiplexer 435 is selected to add the selected multiple of M1 from M-RAM 414 to the aforementioned output of S+B Adder 430. The sum is latched into S-register 445 as the new interim result, completing the operation that was defined by the control code of the current clock cycle.

In the following clock cycle, a similar process is followed for the multiplication involving A2, B2, and M2, with these differences: Channel selection register 450 is set to a '1' to select the upper banks of B-RAM 412 and M-RAM 414, which contain the same digit of multiples of B2 and M2. A digit of A2 is latched into A-register 422, a corresponding value of q is latched into Q-register 424, and a control code for this operation is latched into Control logic 410. The value received from the S-register in the PE to the left is the value that was generated in the previous cycle when the PE to the left was working on the multiplication involving A2, B2, and M2, so the correct values for this particular multiplication are maintained.

In the next clock cycle, the PE returns to working on the multiplication involving A1, B1, and M1, using new values for A-register 422, Q-register 424, and the control code. When all digits of A1 have propagated through the PE, the value in S-register 445 is a digit of the final result of the first Montgomery multiplication. One cycle later, when all digits of A2 have propagated through the PE, the value in S-register 445 is a digit of the final result of the second Montgomery multiplication. When all digits of A1 and A2 have propagated through all PEs, both Montgomery multiplications are complete as determined at block 560 of FIG. 5.

In a series of consecutive Montgomery multiplications, if the results R1, R2 are to be used as the new values of B1, B2 in the next Montgomery multiplications, the digits of each result in S-register 445 are loaded into B-RAM 412 in two consecutive clock cycles as digits of B1, B2, and multiples are calculated as previously described above under 'Pre-calculate multiples of B and store in the B-RAMs'. If both results are final results, in block 570 of FIG. 5 the results are propagated through the PEs to the right until all digits of the results have propagated into MM 220, from where the results can be made available to other devices in the system. In one embodiment, the contents of S-Register 445 are loaded into R-register 460 through the right-hand input of multiplexer 455 in every PE, then the contents of all R-registers 460 are passed through each other to the right into MM 220 by selecting the left-input of the multiplexer 455 in every PE. In another embodiment, R-register 460 and second multiplexer 455 are not included in the PEs, and the result is passed to the right through the S-registers of every PE using the S-In and S-Out connections, in much the same manner as original parameters were loaded as described above under 'Load Initial Values into the B-RAMs and/or M-RAMs.

The foregoing description is intended to be illustrative and not limiting. Variations will occur to those of skill in the art. Those variations are intended to be included in the invention, which is limited only by the spirit and scope of the appended claims.

I claim:

1. An apparatus comprising:
a first storage element in a processing element of a linear systolic array Montgomery multiplier to store a first set of values, a selected one of the first set of values to be used for a first computation, and to store a second set of values, a selected one of the second set of values to be used for a second computation, wherein the first storage element comprises a first bank of storage locations to store the first set of values and a second bank of storage locations to store the second set of values;
a second storage element in the processing element to store a third set of values, a selected one of the third set of values to be used for the first computation, and to store a fourth set of values, a selected one of the fourth set of values to be used for the second computation; and
processing logic in the processing element coupled to the first and second storage elements to perform the first computation during a first clock cycle and to perform the second computation during a second clock cycle immediately following the first clock cycle.

2. The apparatus of claim 1, wherein:
the processing logic includes a first address register to provide a first address to the first bank of storage locations during the first clock cycle and to provide a second address to the second bank of storage locations during the second clock cycle.

3. The apparatus of claim 1, wherein:
the processing logic includes a selection register to select between the first bank and the second bank.

4. The apparatus of claim 1, wherein:
the processing logic includes control logic to receive control codes, the control codes including a channel selection value to select between the first bank and the second bank.

5. The apparatus of claim 1, wherein:
the second storage element includes a third bank of storage locations to store the third set of values and a fourth bank of storage locations to store the fourth set of values.

6. The apparatus of claim 5, wherein:
the processing logic includes a second address register to provide a third address to the third bank of storage locations during the first clock cycle and to provide a fourth address to the fourth bank of storage locations during the second clock cycle.

7. The apparatus of claim 1, wherein:
the processing logic includes control logic to receive a first control code for the first computation during the first clock cycle and a second control code for the second computation during the second clock cycle.

8. The apparatus of claim 1, wherein:
the first set of values includes no values in common with the second set of values.

9. The apparatus of claim 1, wherein:
the third set of values includes no values in common with the fourth set of values.

10. An apparatus comprising:
a chain of serially-connected processing elements in a linear systolic array Montgomery multiplier circuit to perform a first Montgomery multiplication in a first Montgomery multiplier channel and to perform a second Montgomery multiplication in a second Montgomery multiplier channel; and
a controller coupled to the chain to provide a first set of parameters and control codes to the chain to perform the first Montgomery multiplication and to provide a second set of parameters and control codes to the chain to perform the second Montgomery multiplication, wherein the controller is further to provide a first channel selection value to perform the first Montgomery multiplication and a second channel selection value to perform the second Montgomery multiplication.

11. The apparatus of claim 10, wherein:
the controller is further to provide the first set of parameters and control codes to the chain during a first set of clock cycles and to provide the second set of parameters and control codes to the chain during a second set of clock cycles.

12. The apparatus of claim 11, wherein:
the controller is further to provide first and second initial values to the chain before providing the first and second sets of parameters and control codes.

13. A system comprising:
a processor;
a main memory coupled to the processor;
a plurality of processing elements in a linear systolic array Montgomery multiplier circuit coupled to the processor, the plurality of processing elements connected together in a chain of processing elements to perform a first Montgomery multiplication during a first set of clock cycles and to perform a second Montgomery multiplication during a second set of clock cycles interleaved with the first set of clock cycles; and
a controller coupled to the chain to provide a first set of parameters and control codes to the chain during the first set of clock cycles to perform the first Montgomery multiplication and to provide a second set of parameters and control codes to the chain during the second set of clock cycles to perform the second Montgomery multiplication.

14. The system of claim 13, wherein:
the controller is further to provide first and second initial values to the chain before providing the first and second sets of parameters and control codes.

15. The system of claim 13, wherein:
the controller is further to provide a first channel selection value to perform a first Montgomery multiplication and a second channel selection value to perform a second Montgomery multiplication.

16. A method comprising:
storing multiples of first and second parameters in a linear systolic array, a selected one of the first parameters and a selected one of the second parameters to be used to perform a first Montgomery multiplication;
storing multiples of third and fourth parameters in the linear systolic array, a selected one of the third parameters and a selected one of the fourth parameters to be used to perform a second Montgomery multiplication, the selected ones of the third and fourth parameters having different values than the selected ones of the first and second parameters; and
performing the first and second Montgomery multiplications concurrently,
wherein said performing concurrently comprises
providing a first set of control codes to the linear systolic array to control the first Montgomery multiplication;
providing a second set of control codes to the linear systolic array to control the second Montgomery multiplication; and
interleaving the first set of control codes with the second set of control codes as said first and second sets are provided to the linear systolic array.

17. The method of claim 16, wherein concurrently performing includes:
performing portions of the first and second Montgomery multiplications in alternating clock cycles in a particular processing element of the linear systolic array.

18. A machine-readable medium that provides instructions, which when executed by a set of one or more processors, cause said set of processors to perform operations comprising:
providing first, second, third, and fourth parameters to a Montgomery multiplier;
causing the Montgomery multiplier to store multiples of the first and second parameters in processing elements of a linear systolic array;
causing the Montgomery multiplier to store multiples of the third and fourth parameters in the processing elements of the linear systolic array, the third and fourth parameters having different values than the first and second parameters; and
causing the Montgomery multiplier to perform the first and second Montgomery multiplications concurrently using selected ones of the multiples of the first, second, third and fourth parameters;
wherein said causing the Montgomery multiplier to perform comprises providing a first set of control codes to the linear systolic array to control the first Montgomery multiplication;
providing a second set of control codes to the linear systolic array to control the second Montgomery multiplication; and
interleaving the first set of control codes with the second set of control codes as said first and second sets are provided to the linear systolic array.

19. The medium of claim 18, wherein said causing the Montgomery multiplier to perform includes:
performing portions of the first and second Montgomery multiplications in alternating clock cycles in a particular processing element of the linear systolic array.

* * * * *

UNITED STATES PATENT AND TRADEMARK OFFICE
CERTIFICATE OF CORRECTION

PATENT NO. : 6,732,133 B2
DATED : May 4, 2004
INVENTOR(S) : Ruehle

It is certified that error appears in the above-identified patent and that said Letters Patent is hereby corrected as shown below:

Column 9,
Line 28, delete "B" and insert -- B1 --.
Line 31, insert -- 5) -- at the beginning of the line.

Signed and Sealed this

Twentieth Day of July, 2004

JON W. DUDAS
*Acting Director of the United States Patent and Trademark Office*